United States Patent Office 2,952,642
Patented Sept. 13, 1960

2,952,642

ELECTROLUMINESCENT PHOSPHOR

Alden B. Davis, Towanda, Pa., assignor, by mesne assignments, to Sylvania Electric Products Inc., Wilmington, Del., a corporation of Delaware No Drawing. Filed Dec. 5, 1952, Ser. No. 324,407

1 Claim. (Cl. 252—301.6)

This invention relates to electroluminescent phosphors, that is, to phosphors which luminesce under the action of an electric field.

Sulphides or selenides of zinc, cadmium and the like, activated with copper, lead or manganese and the like, singly or in combination, have been used as such phosphors. I have now discovered that the addition of magnesium improves the lumen maintenance, shifts the color toward the yellow, decreases the current taken by the phosphor, reduces the average particle size, and if the amount of magnesium be sufficient, permits the elimination of the acid-washing necessary for good brightness with other phosphors. However, acid-washing, if used, will increase the brightness somewhat, and the average particle size as well, and will decrease the amount of shift toward the yellow.

Although even a small amount of magnesium is effective in shifting the color and in increasing the brightness per unit current, larger amounts can be used, as shown in the following table:

Table 1

| Moles MgO | Current in Ma. | Light Output | Color Ratio |
|---|---|---|---|
| 0.00 | 0.36 | 215 | 1.90 |
| 0.01 | 0.32 | 215 | 1.63 |
| 0.05 | 0.28 | 220 | 1.39 |
| 0.10 | 0.26 | 215 | 1.21 |
| 0.30 | 0.26 | 210 | 1.14 |
| 0.60 | 0.24 | 210 | 1.32 |
| 1.00 | 0.25 | 210 | 1.55 |

It will be seen that as the magnesium content is at first increased, the blue/yellow ratio drops, becoming a minimum at about 0.3 mole, and then rises as the magnesium content is further increased. At about 3 moles or above, not shown in the above table the ratio of blue/yellow becomes even greater than that without any magnesium. The phosphors listed in Table 1 were acid-washed, as hereinafter described.

Table 2

| Mols MgO | Treatment | Readings at 500 Volts | | |
|---|---|---|---|---|
| | | Current in Ma. | Brightness | Color Ratio, Blue/yellow |
| .30 | Washed | .30 | 19 | 1.19 |
| .30 | Unwashed | .24 | 14 | .78 |
| .60 | Washed | .27 | 20 | 1.32 |
| .60 | Unwashed | .16 | 12 | .93 |
| 1.00 | Washed | .30 | 20 | 1.47 |
| 1.00 | Unwashed | .15 | 13 | 1.15 |

It will be seen from the above that the unwashed phosphor is even lower in blue-yellow ratio than the washed phosphor.

Acid-washing of zinc sulfide phosphors prepared without magnesium greatly decreases the current passed, whereas the same washing of phosphors prepared with magnesium increases the current passed. The brightness, however, is increased in both cases, the increase being somewhat smaller for the magnesium-containing phosphors.

These results appear to be due to the fact that magnesium oxide is an insulator, whereas the usual zinc oxide added, or formed to some extent during the firing, is a semi-conductor. The fine zinc oxide particles become a smaller proportion of the total fine particles when magnesium oxide is present, and in addition the presence of any magnesium oxide on the particle surface will be of an insulating nature, whereas the zinc oxide would be of a semi-conductive nature. Although only about 0.001% or less by weight of magnesium is present in the phosphor after the acid wash, that much is sufficient to shift the phosphor's emission color toward the yellow.

The effect of the acid-washing on the particle size is shown below:

Table 3

| Mols MgO | Reading at 500 Volts | | |
|---|---|---|---|
| | Average Particle Size Before Washing, Microns | Average Particle Size After Washing, Microns | Percent Yield |
| .00 | 12.2 | 13.0 | 87 |
| .01 | 12.8 | 14.2 | 87 |
| .05 | 11.0 | 13.2 | 88 |
| .10 | 9.0 | 12.2 | 86 |
| .30 | 6.0 | 12.2 | 80 |
| .60 | 4.0 | 11.8 | 72 |
| 1.00 | 3.0 | 11.4 | 64 |

The above results are unexpected, because washing in acid would normally be expected to etch away a little of each particle, and thus reduce the particle size. But with the phosphor of the present application, the smaller particles which appear to be chiefly magnesium and zinc oxides or carbonates, are completely dissolved away, leaving only the larger particles, thus increasing the average particle size. The percent-yield column above gives the percentage by weight of phosphor remaining as particles after the acid treatment, and indicates that an amount of material about equal to the total zinc oxide and magnesium oxide content has been dissolved away, there being about 0.11 mole of zinc oxide present per mole of sulfide in all samples.

A small amount of magnesium, of the order of 0.001% by weight of zinc sulphide, remains in the phosphor.

The effect of copper content on the phosphor is shown by the table below, the amount of copper and of magnesium oxide being given per 0.89 mole of zinc sulfide in each case (there being 0.11 mole of zinc oxide):

Table 4

| Moles Copper | Moles MgO | Readings at 500 Volts | | |
|---|---|---|---|---|
| | | Current in Ma. | Brightness | Color Ratio, Blue/yellow |
| .0053 | | .12 | 15.0 | 4.00 |
| .0053 | .10 | .10 | 9.0 | 2.86 |
| .00088 (control) | | .36 | 20.5 | 1.76 |
| .00088 | .10 | .27 | 19.5 | 1.19 |
| .0012 | | .39 | 17.0 | .90 |
| .0012 | .10 | .35 | 17.0 | .81 |

The effect of lead addition to the phosphor is shown below:

Table 5

| Moles Lead | Moles MgO | Readings at 500 Volts | | |
|---|---|---|---|---|
| | | Current in Ma. | Brightness | Color Ratio, Blue/yellow |
| .0004 | | .36 | 17.0 | 1.75 |
| .0004 | | .35 | 20.0 | 1.40 |
| .0012 | | .36 | 20.5 | 1.76 |
| .0012 | | .27 | 19.5 | 1.19 |
| .0024 | | .38 | 20.0 | 1.45 |
| .0024 | | .25 | 17.0 | 1.00 |

The lead compounds formed during the firing of the material are very volatile, so that less than about 0.01% by weight of lead (less than about 0.0004 moles lead per mole of sulphide) remains after firing. The amount of retained lead can be between 0.0001% by weight to about 0.003% for best results. The loss of other materials during firing is negligible except for the chlorine of which only about 0.1% by weight of zinc sulfide, remains in the phosphor.

The phosphors in the above tables, except where a compound is specified as being present in a different amount, were made by mixing the following ingredients as powders of fine particle size, in the amounts given below:

ZnS _____ 0.89 mole.
ZnO _____ 0.11 mole.
PbCO$_3$ _____ 0.0012 mole.
CuCO$_3$.Cu(OH)$_2$ ___ 0.00044 mole (.00088 mole Cu).
MgCO$_3$ _____ 0.10 mole.

The dry powders were blended, hammermilled, then blended and hammermilled a second time and then reblended.

The mixtures were fired in air in an electrically heated furnace in covered 100 ml. crucibles of silica, although porcelain and other inert refractory crucibles can be used. The mixtures were fired for three hours at 1750° F., although temperatures between 1600° F. and 1800° F. could be used with optimum brightness. The firing could be varied between ¾ and 6 hours, the best firing time varying with the size of the crucible.

The covered crucibles were removed hot from the furnace and allowed to cool in air before the covers were removed. The fired material was inspected under 3650 Angstrom ultraviolet light and the inert or non-fluorescent layer on top was removed from the fired "cake" of material.

The powdered cake was then washed in dilute acetic acid. 200 grams of fired phosphor was suspended in a 90° C.±5° C. solution of 1000 cc. H$_2$O+50 cc. glacial acetic acid. The suspension was agitated 5 minutes, allowed to settle 5 minutes and the supernatant liquid was decanted. Two additional washes in 60° C.±5° C. solutions of 800 cc. of H$_2$O+8 cc. of glacial acetic acid were made wherein the suspension was stirred for 1 minute, settled 5 minutes and the supernatant liquid decanted. The material was then washed 4 times in 1 liter of 60° C.±5° C. deionized water by stirring 1 minute, settling 5 minutes and decanting. The material was then filtered and dried at approximately 240° F.

With the phosphors of very high magnesium oxide content, the amount of acid was increased enough to keep the solution acidic. The magnesium oxide tended to neutralize the acid.

Other washes can be used, as shown in the copending application Serial No. 180,783, filed August 22, 1950, now U.S. Patent No. 2,838,715, by Elmer C. Payne.

The light output was determined by mixing 1.0 gram of phosphor in 1.2 cc. castor oil and spreading the mixture in a layer 0.005 inch thick, between a metal plate and a piece of conducting glass. The light output was measured, in arbitrary units, using a photomultiplier tube with a suitable amplifier, the whole giving a linear response to light. A 60-cycle alternating voltage of 500 volts was applied between the metal plate and the conducting glass to generate the light.

The color was determined by using blue and yellow filters in front of the photomultiplier tube and the ratio of the readings, in arbitrary units is given as color ratio in Table 1.

Although the specific example described above is a green-luminescing phosphor, the invention is applicable to phosphors luminescing other colors. A phosphor whose luminescence is predominantly blue will contain less copper and less chlorine, and a phosphor luminescing predominantly yellow will contain manganese as an additional activator. Nevertheless, the blue/yellow ratio of blue, green and yellow phosphors can be changed by the addition of magnesium.

While lead and copper carbonates have been used as the activating or sensitizing compounds in the examples given, other salts of those metals, for example the halides (especially chlorides and fluorides), the oxides, and compounds reducible to the halides or oxides on heating.

I have found also that the addition of MgO before firing improves the maintenance of light output when the phosphor is used in a lamp. Two lamps were made to have the same initial light output and were burned at 600 volts 60 cycles for 100 hours. At the end of this burning period, the lamp containing the phosphor made with MgO addition had a light output 20% above that of the standard type of phosphor, free of MgO.

I have also found that good electroluminescent phosphors may be made using zinc oxide and sulfur instead of zinc sulfide. When fired in covered crucibles in air this phosphor is much improved in brightness by the addition of magnesium carbonate to the unfired mix. This method has the advantage of using cheaper and more available raw materials.

The formula for a typical sample made with these materials is as follows:

| | Mols |
|---|---|
| ZnO | 1.0 |
| Sulfur | 2.0 |
| PbCO$_3$ | .0012 |
| CuCO$_3$.Cu(OH)$_2$ | .00044 |
| Magnesium carbonate (basis) | .10 |
| (NH$_4$)$_2$SO$_4$ | .0125 |
| NH$_4$Cl | .0125 |

The above ingredients were mixed in powdered form, heated for three hours at 1720° C. and then washed with dilute acetic acid.

The word "mole" has been used in the foregoing specification as including both "moles" and "gram-atoms," the latter being the more exact term when a quantity of an element, rather than of a compound, is considered.

The amount of magnesium present may be between a trace and 4 moles per mole of zinc sulfide.

The ZnS used in the earlier example contained about 2% by weight of chlorine.

The magnesium compound used can be a halide or oxide or a compound reducible to the halide or oxide.

What I claim is:

The process of producing light by applying a 500-volt 60-cycle alternating electric field to an electroluminescent phosphor comprising zinc sulfide containing lead and copper in amounts sufficient for electroluminescent activation, and containing about 0.001% magnesium by weight.

References Cited in the file of this patent

UNITED STATES PATENTS

| 2,402,757 | Leverenz | June 25, 1946 |
| 2,614,082 | Smith | Oct. 14, 1952 |
| 2,660,566 | Froelich | Nov. 24, 1953 |

FOREIGN PATENTS

| 299,797 | Great Britain | Nov. 1, 1928 |